Oct. 13, 1964  E. H. CARRUTHERS ETAL  3,152,912
METHOD OF PREPARING FISH FOR CONSUMPTION
Filed Sept. 26, 1960  3 Sheets-Sheet 1
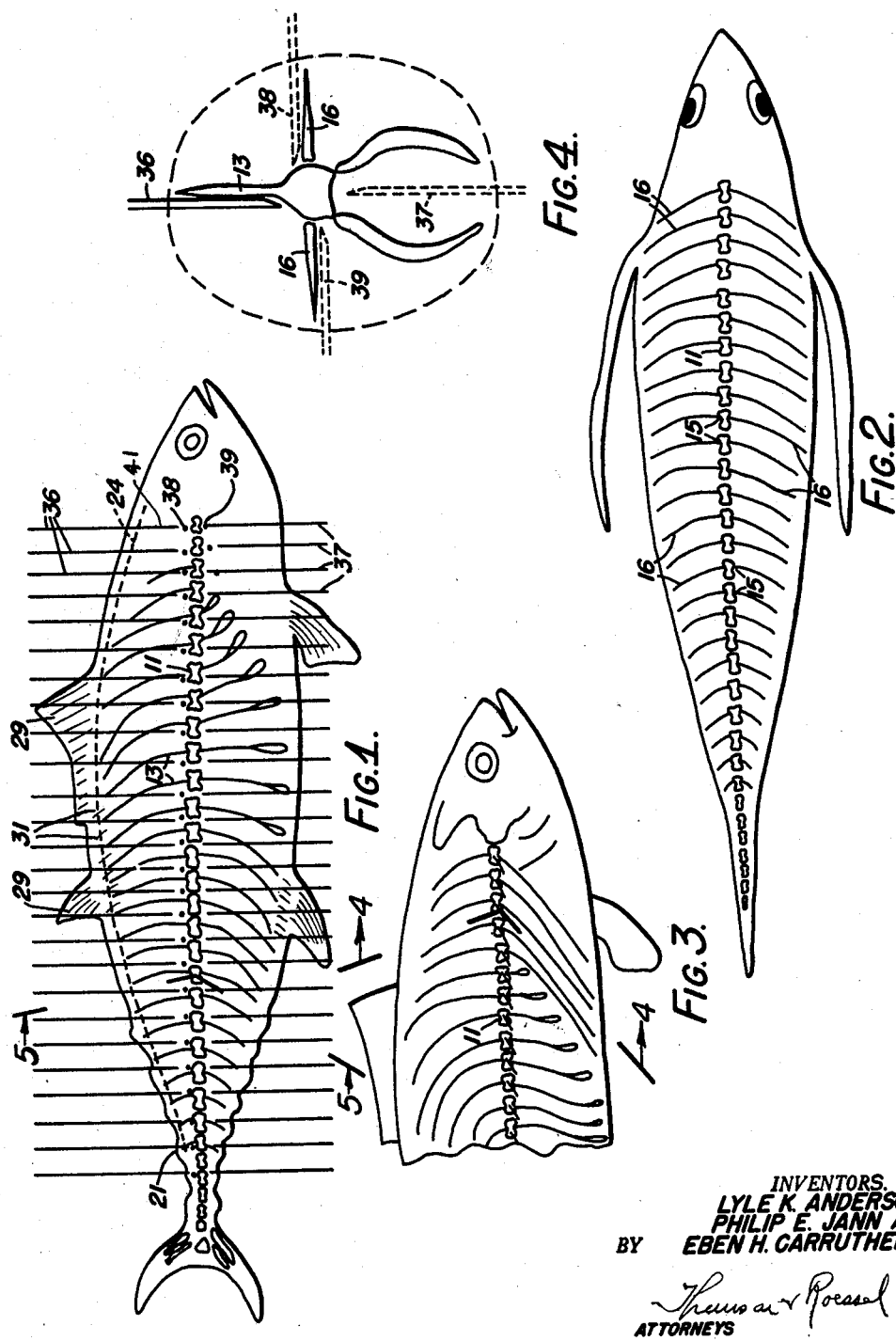
INVENTORS.
LYLE K. ANDERSON
PHILIP E. JANN AND
BY  EBEN H. CARRUTHERS
ATTORNEYS Oct. 13, 1964    E. H. CARRUTHERS ETAL    3,152,912
METHOD OF PREPARING FISH FOR CONSUMPTION
Filed Sept. 26, 1960    3 Sheets-Sheet 2
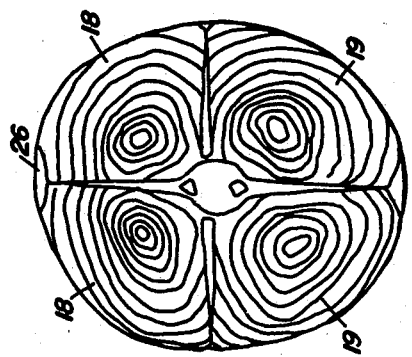
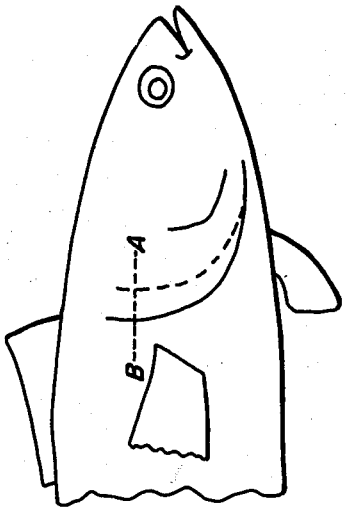
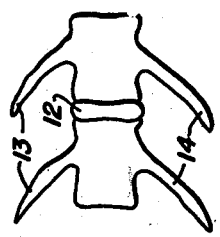
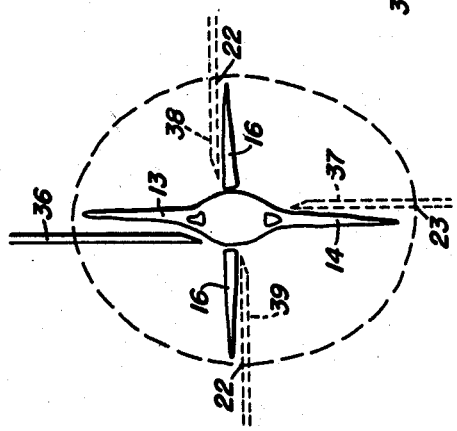
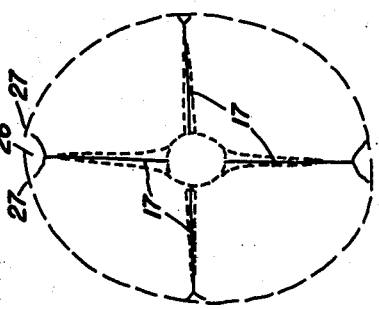
INVENTORS.
LYLE K. ANDERSON
PHILIP E. JANN AND
BY  EBEN H. CARRUTHERS
ATTORNEYS Oct. 13, 1964 E. H. CARRUTHERS ETAL 3,152,912
METHOD OF PREPARING FISH FOR CONSUMPTION
Filed Sept. 26, 1960 3 Sheets-Sheet 3
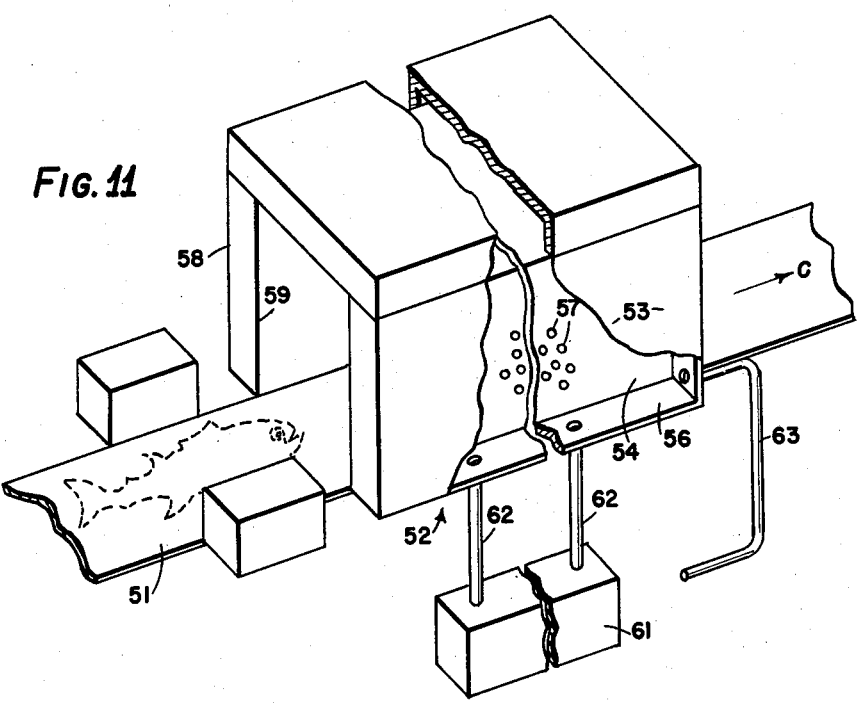
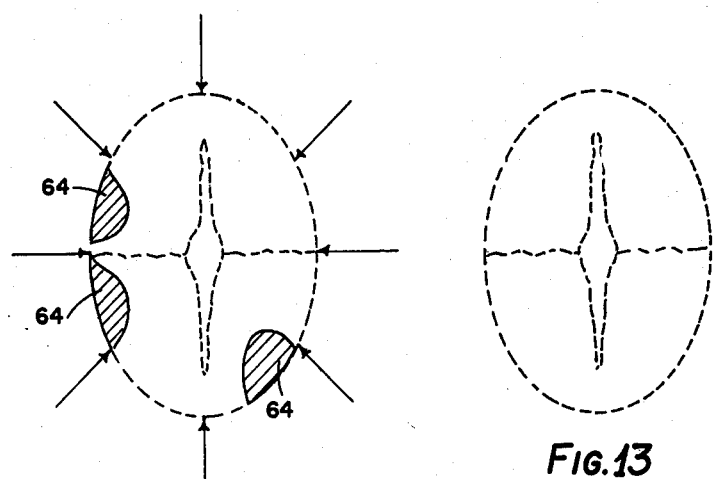
INVENTORS.
LYLE K. ANDERSON
PHILIP E. JANN AND
BY EBEN H. CARRUTHERS
ATTORNEYS

3,152,912
METHOD OF PREPARING FISH FOR CONSUMPTION
Eben H. Carruthers, Lyle K. Anderson, and Philip E. Jann, Warrenton, Oreg., assignors to Fish Processes Corporation, Warrenton, Oreg., a corporation of Oregon
Filed Sept. 26, 1960, Ser. No. 58,348
14 Claims. (Cl. 99—111)

This invention relates to a commercial method of preparing fish for human consumption. This invention is related to our previous application Serial No. 766,177, filed October 7, 1958, now Patent No. 2,954,298, issued on September 27, 1960, and is in part a continuation thereof.

The method of this invention may have general application in the canning of various species of fish that require a precooking treatment prior to being canned. Such a precooking treatment may be necessary for different reasons in the case of different species of fish. Some fish may require precooking to facilitate cleaning and bone removal; others to remove undesirable oil; and still others to control texture and water content. An example of a fish that does not require precooking for commercial canning purposes is salmon and an example of a fish that does require precooking for commercial canning purposes is tuna. It is with regard to tuna that this invention is especially directed but it is to be understood that it is a method of precooking fish that would have application wherever precooking of fish is done commercially. For the purposes of comparison and more distinctly pointing out this invention, the process presently employed for the preparation of tuna and related species for canning consists essentially of the following steps with only minor variations in the techniques employed by the various canners.

If the tuna reaches the cannery in a frozen condition it is first thawed after which the fish is placed on a butchering table and the belly of the fish slit open. The visceral organs are then removed and the body cavity thoroughly washed out. In some procedures the head is then removed but more usually the head is removed at a later step in the process.

The partly cleaned fish are then placed in wire baskets or other holders and subjected in a suitable low pressure retort or steam chamber to the cooking action of steam at from 212° to 220° F. until the flesh has been what is termed in the art "precooked." The entire fish must be cooked to such a degree that the tissues holding the fleshy segments or tuna loins to the bony and cartilaginuous material which may be generally termed the skeletal structure, are so weakened, loosened or broken down that the loins or fleshy segments may be readily torn away and separated from the skeletal structure. It is at the precooking step that one of the major differences between our method and present commercial practices occurs.

The precooking step in present commercial practice involves precooking the gilled and eviscerated fish which we will term for convenience of expression "cooking in the round." That is, the dressed but whole fish is cooked and, since the cooking must extend to the spinal formation adjacent the longitudinal center of the fish to enable subsequent cleaning the duration of the cook is relatively lengthy. The cooking time may vary from 1½ hours for very small fish of say eight to ten pounds such as skipjack to from 8 to 10 hours for large yellowfin or bluefin which may weigh up to 300 pounds.

It has been generally thought by workers in the tuna industry that the primary purpose for precooking tuna is to remove the natural oils which are supposedly bitter and lend to the canned product an excessively fishy taste. The natural oils are later replaced in accordance with usual practices with vegetable oils supposedly to render the fish more satisfactory to the taste than would otherwise be the case if the natural oils of the fish were retained. However, some technical opinion which has at least been partially verified considers that the removal of the natural oils occurring in the precooking is insufficient percentagewise to materially influence the taste of the resulting product. Whether this is true or not is immaterial, since the fish must be precooked for a lengthy period of time for the purpose of breaking down or loosening the tissues which hold the flesh of the fish to the skeletal structure.

Various efforts have been made to eliminate precooking or to avoid cooking in the round because of inherent disadvantages. One such effort is represented by Borg Patent No. 2,411,188, another by Stevenson et al. Patent No. 2,635,050, and a third by Berglund Patents Nos. 2,534,219 and 2,612,652. These processes, insofar as we are aware, have not been commercially accepted.

Briefly, the excessive and uneven cooking necessitated by cooking in the round has the following distinct and very serious disadvantages: the hazard presented by bone fragments embedded in the loins or tuna segments; the excessive cooking time and subsequent cooling time required before the fish can be further processed; the excessive time during which the fish are exposed to the air and consequent enzyme action; the losses resulting from shrinkage of the fish due to the loss of natural oils, juices and moisture; the lack of uniform cooking, the inferior portions thereof being usually undercooked; the undercooking of large fish and the overcooking of small fish cooked in the same batch; "running of the color" of the dark undesirable portions of the fish into the light edible portions of the fish during cooking and subsequent cooling; and the excessive cost resulting from increased labor, fuel and cooking facilities.

Tuna is an expensive fish and the losses resulting from present procedures are substantial. According to some practical men in the field and the Special Scientific Report, Fisheries No. 104 of the United States Fisheries and Wildlife Service, during precooking and cooling, shrinkage takes place amounting up to 30 percent of the weight, of the tuna, two-thirds to three-fourths of the loss occurring during cooking and the balance during cooling of the fish. This is caused by loss of oil, solids and moisture during cooking and loss of moisture due to evaporation and drip during cooling of the fish. Since the cost of the fish in the neighborhood of about four hundred dollars ($400.00) per ton represents approximately seventy (70%) percent of the processor's cost, any saving in the shrinkage occurring during precooking and cooling is of the greatest importance.

The next step in the presently employed process of preparing tuna for canning is the cooling of the precooked fish. It will be appreciated that a warm fish is relatively fragile and friable. The fish cannot be handled without breaking apart and flaking during subsequent cleaning. Tuna flakes sell at a substantial discount. The flesh must be firm before subsequent steps of the process can be carried out. In some canneries the precooked tuna is cooled under a refrigerated atmosphere. In most plants the tuna is air cooled. By either method the cooling period is lengthy, air cooling requiring 12 to 16 hours and cooling time of 24 hours is not unusual. Losses during cooling of the precooked fish may amount to as much as 10 percent of the total weight according to the technical report previously mentioned.

After the fish has been thoroughly cooled the head is removed unless this has been done earlier. The skin and fins are scraped off and undesirable meat closely underlying the skin removed during the scraping. This step is usually accomplished by scraping the fish with a knife. The fish is then split by a knife longitudinally and the backbone or spinal formation cut away. The fish is then separated into quarters or loins and these fleshly segments are further freed of small detached and adhering or imbedded bones and cartilage. The loins or segments are further scraped for the purpose of removing dark meat, discolored flesh and any other undesirable tissues. The desirable remaining loins are then ready to be chopped, cut or formed for placement in cans or other containers. Usually salt and a vegetable oil are added after which the container is sealed and the filled can retorted.

It will be appreciated that the above described present process is time-consuming, expensive and wasteful. Yet as mentioned above, it has withstood the efforts of a great many researchers in the field to improve the process. Notwithstanding, with relatively minor changes it has been the standard procedure substantially since the inception of tuna canning in this country. The only minor change which has occurred in the procedures of the industry has been the introduction of mechanical packing machines for automatically cutting the loins and placing the proper weight of tuna into the cans by machine. Insofar as commercial practices are concerned, no material change has been made in the procedures for cleaning and preparing the tuna up to the placing of the tuna in the cans.

An object of our invention is to provide an improved process for preparing fish for market to effect a saving in labor, a saving in time, minimize wastage of raw material and effect a savings in cost.

Another object of our invention involves a step in the process of preparing tuna for market which may be termed "controlled cooking" which enables the separation of the usable loins of the fish from the skeletal structure wtih a minimum of hazard from the possibility of bone fragments adhering to or being imbedded in the separated loins.

A further object of our invention is to effect a very material reduction in the cooking time required which results from the present practices of cooking the fish to thereby accomplish a reduction in the cost of fuel, and labor, a reduction in the wastage of edible product, and the processing of more fish with the same amount of or less equipment and cannery space.

A further object of our invention is to enable more uniform distribution of heat to be accomplished during the precooking step with attendant decreases in the undesirable attributes of overcooking and undercooking.

A further object of our invention is to provide a method and means by which the fish is cooked both internally and externally to accomplish a more thorough and uniform pre-cooking of the fish.

Our invention further contemplates passing the fish to be cooked through a steam tunnel to cook the fish externally and cook the fish internally by the application of heat internally of the fish prior to, simultaneously with or subsequent to the external cooking.

Other objects and advantages of our invention will be particularly set forth in the claims and will be apparent from the following description, when taken in connection with the accompanying drawings, in which:

FIGURE 1 is a diagrammatic partly phantom view, being a side elevation of a tuna, the view and subsequent views showing approximately a composite of the main parts of the skeletal structure of a skipjack and an albacore tuna, the view showing the banks of horizontally and vertically projecting steam needles by which part of the process of our invention is carried out;

FIGURE 2 is a top plan partly phantom view of FIGURE 1 and showing the central backbone or spinal formation and the epi-central ribs;

FIGURE 3 is a more detailed view of a portion of FIGURE 1 showing the general skeletal structure of the anterior section of the fish and in particular showing the pleural ribs;

FIGURE 4 is a sectional view taken substantially on the line 4—4 FIGURE 3 and showing the steam needles in dotted lines;

FIGURE 5 is a sectional view taken substantially on the line 5—5 of FIGURE 1 and showing the steam needles in dotted lines;

FIGURE 6 is an enlarged view of a portion of the spinal column to clearly show the intervertebral pod;

FIGURE 7 is a sectional view approximately taken on the same line as FIGURE 5 showing the muscle segments or loins of the fish and the cleavage planes;

FIGURE 8 is a typical cross-section in the posterior portion of the fish taken approximately on the same line as FIGURE 5 showing the approximate myosepta pattern or membranelike tissue between the bones and defining the natural cleavage planes which aid in separating the loins;

FIGURE 9 is a sectional view of one type of steam needle which may be employed in carrying out one of the steps of our method;

FIGURE 10 is a side view of the head of the fish showing the collar or branchial arch of the fish;

FIGURE 11 is a diagrammatic view showing one way in which the fish may be cooked externally;

FIGURE 12 is a cross-sectional view of a tuna fish somewhat similar to FIGURES 5 and 8 showing the possible points of application of the steam needles when the fish is to be completely pre-cooked;

FIGURE 13 is a view similar to FIGURE 12 and is intended to illustrate a fish completely pre-cooked by the application of heat both internally and externally of the fish.

In the tuna industry the four pieces of fish which are separated from each other longitudinally of the fish by ribs or spines and the membranes between these ribs and spines are usually termed "loins." We are not aware of whether this term is common in the fish industry and means the same thing in other segments of the fish industry. Therefore, for the most part in this specification and the appended claims we will employ the word "loins" as applying to any fish and as applying to a section of a fish which is separated from other sections by rows or lines of bones and/or membranes extending between the bones to define approximate planes of cleavage or partitions.

The term "denaturing" by dictionary definition is broad. In the absence of a more apt term, as used in this application it will be employed to define the alteration of a protein from its native state wherein it becomes at least partially coagulated among other phenomena and will apply particularly to the weakening or degradation of the strength of the proteinaceous tissues, especially those tissues joining muscle parts to the skeletal structure or to the common integument. "Denaturing" can be accomplished by heat applied preferably in the form of steam. While steam has been found to be satisfactory as the heating or cooking medium, it is possible that other well known forms of applying heat would be practicable such as hot inert fluids, electrical resistance heating, electrical capacitance heating or other heating means.

For the purpose of more clearly presenting our invention, it is desirable that the most important elements of the skeletal structure of a tuna fish be clearly in mind. The drawings are largely diagrammatic and it is not intended that they shall show in exact detail the entire skeletal structure of a tuna fish. In fact as previously mentioned, actually the drawings are an approximate composite of the skeletal structure of an albacore and a skipjack. In employing the terms to describe our process we have for the most part used terms which we believe to be accurate. Notwithstanding the fact that there appears to be some differences of opinion among those skilled in the art as to proper terminology, no confusion will result in case of minor error as it is believed that what is meant will be clear to those skilled in the art from the specification aided by the drawings.

In general, the skeletal structure of a tuna fish comprises a backbone or spinal formation indicated by the numeral 11 which is approximately centered with respect to the fish and extends from the head into the tail. The bones of the spinal formation are connected by what we believe is known as the intervertebral pod 12 (see FIG. 6). The intervertebral pod is of somewhat cartilaginous nature and allows the spinal formation to bend or flex. Extending vertically upward and integral with the bones of the spinal formation are what are known as neural spines 13 and extending vertically downward and integrally secured to the bones of the spinal formation are what are known as haemal spines 14. The neural and haemal spines are shown in FIGURE 6. The spines and the bones of the spinal formation are sometimes termed the backbone. For the purposes of the claims, the expression "spinal formation" will be employed to designate the longitudinally extending bones 11 and the spines, although considered to be part of the backbone, when specifically included will be separately considered.

Referring to FIGURE 2, attached to the bones of the spinal formation by ligaments at 15 and extending outwardly on each side of the spinal formation are what are known as epi-central ribs 16. These epi-central ribs, unlike the neural and haemal spines, are not integral with the bones of the spinal formation. They are more readily loosened with respect to the spinal formation than are the spines, when heat or other tissue or ligament-weakening media are applied to them. Between adjacent spines and adjacent ribs and extending longitudinally of the fish and outwardly from the spinal formation is a tough membrane 17 (FIG. 8) which in accordance with our information is known as the myoseptum. The membrane between neural spines is called the dorsal skeletogenous septum and the membrane between the haemal spines is called the ventral skeletogenous septum. The myosepta between the epi-central ribs while less pronounced than the myosepta between the spines, at least in tuna, are sufficiently tough and strong for the purposes of our invention as will presently appear. In the claims, when included, these myosepta 17 will be called "membranes." Myosepta appear to be absent between the epi-central ribs of salmon species we have examined but may be present in other fish species.

From the foregoing it will be understood that the tuna is divided into four sections distinctly separated from each other by continuous walls which define natural planes of cleavage. These natural planes of cleavage are made up of the bones which extend essentially radially with respect to the spinal formation and the membranes extending between the bones. These partitions divide the meaty or muscle portions of the fish into two dorsal loins 18 sometimes termed the right and left epaxial muscles and two ventral loins 19 sometimes termed the right and left hypaxial muscles. These fleshy or muscle portions of the fish, as previously mentioned, are called in the tuna industry "loins."

It is of course possible to apply the method of the above mentioned application, separate the loins from the skeletal structure and then completely pre-cook the loins as distinguished from the fish in the round as contemplated later herein. In such case the tail would be removed by severance of the caudal peduncle located adjacent the numeral 21 (FIG. 1). Then the skin would be slit along the lines indicated by the numeral 22 (FIG. 5) and a belly slit made along the line indicated by the numeral 23 (FIG. 5). The tough strip indicated by the dotted lines 24 in FIG. 1 is shown at 26 in FIG. 8. Removal of this can be accomplished by slitting the fish longitudinally along the lines indicated by the numeral 27 (FIG. 8). Removal of this tough strip removes first and second dorsal fins 29 and the interneural bones 31 (FIG. 1).

The above is fully described in the above mentioned application.

Perhaps the most important aspect of the method of the above mentioned application lies in the realization that these rows of bones and the myosepta between them form natural planes of cleavage. While these planes of separation have been probably understood by those versed in the art, no one insofar as we are aware, has fully taken advantage of them. In accordance with our previous and present invention we take advantage of or utilize these natural planes of separation; to accomplish the separation of the fish into four loins in a minimum of time; the cleaning of the fish in an expeditious manner; the facilitation of the removal of the skin; and the application of better methods of pre-cooking and cooling the fish preparatory to canning. While we have not studied the matter in detail, we believe that most fish have natural planes of cleavage which allow the fish to be separated into four loins or quarters. Not all fish, however, have epi-central ribs lying in the horizontal cleavage planes, as for example, the herring and the salmon.

After the fish have been thoroughly thawed, assuming they have previously been frozen as is usually the case with respect to tuna, the first step in the method of our invention is to eviscerate the fish which is preferably done in the usual manner by slitting open the belly longitudinally of the fish. The visceral organs are then removed and the body cavity washed out. The reason why thorough thawing is desirable is that the parts of the fish adjacent the spinal formation are the last to thaw. In our method, when heat is applied along the planes of cleavage or separation previously mentioned, it is more difficult to secure the desired results if sufficient heat must be applied not only to raise the temperature of the fish to a "denaturing temperature" but also to overcome the latent heat of fusion of any ice present.

The next step in the preferred method of our invention is to sever and remove the head which may be done in the usual manner, although the head may be removed later in the process.

The tuna is now in condition to have applied thereto means for cooking the interior region prior to or concomitantly to cooking the exterior. Cooking is preferably accomplished by heat in the form of steam. The preferred method of applying the steam to the fish is by means of hollow tubular members or needles 32 shown in FIG. 9. These tubular needles have a sharpened end 33 to facilitate piercing of the flesh and a discharge opening 34. The discharge opening is preferably at the forward end of the tubular member 32. However, the forward end may be closed and in lieu thereof side openings in the tube may be provided. We have found a conventional 3½ inch No. 13 stainless steel needle to be satisfactory for the purposes desired. However, it is understood that other sizes of tubular members may be employed.

A single needle may be inserted in the fish at successive points along the lines previously cut in the skin or more accurately along or adjacent the natural cleavage planes which separate most fish into four quarters longitudinally as previously described. A bank of needles has also been employed and in the commercial application of our invention it is probable that the fish would be supported vertically and four banks of needles simultaneously inserted into the fish, each bank encompassing a large part of the longtiudinal extent of the fish. These needles would be projected downwardly into the fish in a plane adjacent the plane defined by the neural spines; upwardly in a plane adjacent the plane defined by the haemal spines and sidewardly into the fish from both sides in planes adjacent the planes defined by the epi-central ribs. In FIG. 1 the vertically projected banks of needles have been indicated by lines 36 and 37, the same banks of needles being indicated in FIGS. 4 and 5 by the same numerals and the horizontally projected banks of needles by the rows of dots 38 and 39 (FIG. 1), these rows being also indicated in FIGS. 4 and 5 by the same numerals.

Experiments have also been conducted to determine the most desirable steam temperature. Employing dry steam at about 20 pounds pressure and 260° F. which gave a temperature nominally greater than 212° F. as the steam emerged from the hypodermic needles gave very satisfactory results.

For example, using a 4-pound skipjack, the needle may be inserted at a rate such as to reach the region of the spinal formation in one second, allowed to pause for 60 seconds and then withdrawn in a period of one second. The fish was found to be cooked throughout although the last portions to cook were between the needle banks and at the skin. The above results were secured on relatively small fish such as skipjack and with a little modification of procedure on relatively small albacore weighing about 10 pounds. It will, of course, be understood that an increase in the time and/or temperature may be desirable if large fish are encountered such as yellowfin or bluefin which may weigh up to 300 pounds.

In another experiment a hollow pipe was fitted with hypodermic needles at half-inch intervals with the needles in the same plane. Steam at 15 pounds pressure per square inch was bled into the pipe manifold and the bank of needles was introduced into each of the four myosepta dividing the fish into quarters. The fish was a ten pound albacore and the insertion time was 90 seconds in each of the four positions. The escaping steam was held in proximity to the skin of the fish with a sheet iron shield to aid in cooking the flesh between the banks of needles and near the skin. After this treatment the fish was found to be precooked within the range employed commercially. Preferably the steam needles are inserted at a rate such that the exterior portions of the fish are cooked at substantially the same rate as the interior portions.

The fish was cooled in air, the loins separated and cleaned, the loins were cut transversely to can length, and the cans were filled, salted, oiled, sealed and retorted in the usual manner.

From what has been described above it will be realized that our process includes completely pre-cooking the fish from the inside out. However, we have also contemplated cooking the fish both from the inside out and the outside in. In FIG. 11, we have diagrammatically illustrated an apparatus suitable for our purpose. A belt conveyor has been indicated by the numeral 51, the fish are placed as shown in dotted lines. As the belt travels in the direction indicated by the arrow C, it passes through a steam chest or steam tunnel indicated by the numeral 52. The steam tunnel comprises a walled member having an outer wall 53 and an inner wall 54 which are supported by members indicated at 56. The inner wall 54 is provided with a multiplicity of perforations 57 preferably throughout its extent both vertically and horizontally. Steam is applied to the external portions of the fish through these perforations as the fish travel along the conveyor. A duplicate steam chest on the opposite side of the tunnel has been indicated by the numerals 58 and 59. Steam is brought to the steam chests formed by the walls 53 and 54 by a manifold 61 from which pipes 62 bring the steam into the steam chest formed by the walls 53 and 54. A steam return line has been indicated at 63. A similar manifold and steam pipes are provided on the other side of the tunnel.

The conveyor may be driven continuously in which case an elongated steam tunnel would be required and the relationship of the length of the tunnel and the speed of travel of the conveyor 51 would be regulated so that the fish would be cooked by the time they reach the discharge end of the tunnel. If, on the other hand, a steam chest is employed, it would be desirable to drive the fish belt 51 intermittently. The fish would then be allowed to remain in the steam chest during the pause for a sufficient length of time to effect the cooking. When the fish is cooked both internally and externally, the time of the cook may be substantially reduced from the figures given above. It will be appreciated that the temperature and time can not be particularly set forth for the reason that fish vary in size from small skipjack of 8 or 10 pounds to large tuna of the yellowfin and bluefin varieties which may weigh up to 300 or more pounds.

While it is desirable that the fish be needled or cooked internally while they are passing through the tunnel or steam chest, it is also contemplated that the needles may be inserted in banks extending around the tuna and longitudinally thereof from substantially the head to the tail either prior to or subsequent to the external cooking. Preferably, however, the banks of needles should be applied while the fish is in the steam chest or while the tuna is moving along the belt. It will be understood if the tuna is moved continuously that the bank of needles would be carried by the conveyor while if an intermittent operation is employed, the bank of steam needles would be supported from the interior side walls of the steam chest.

We have further found that when the needles are applied, as illustrated in FIG. 5, occasional raw spots, as indicated by the shaded lines at 64, are encountered, particularly when the tuna is not cooked externally. As indicated by the arrows, it is also possible to increase the amount of steam applied so as to reduce raw spots even when external cooking is not used by increasing the number of angles at which the needles are applied as indicated by the arrowed lines in FIG. 12. As indicated in that view, the bank of needles in each cross-section of the fish comprises eight needles. Any desired number of needles may be employed in the bank both radially and longitudinally of the fish.

When the multiplicity of needles cooking the fish internally, as shown in FIG. 12, are employed, raw spots are minimized. This is particularly true if the fish is cooked externally simultaneously with the application of a multiplicity of needles as indicated in the FIG. 12. In FIG. 13, I have indicated diagrammatically a fish completely cooked by the application of a multiplicity of needles, illustrated in FIG. 12, and by the use of a steam chest or steam tunnel as illustrated diagrammatically in FIG. 11.

From the foregoing it will be understood that the method of the above mentioned application, that is, to cook the fish as lightly as possible and only along certain areas to enable a separation of the fish into loins, may be preferred by some canners. In utilizing the full-cook invention of this application, the use of the method of the above mentioned application is still desirable in order to enable the separation of the fish from the skeletal structure. Most canners would prefer the use of the full-cook idea but this requires expensive and elaborate machinery and equipment. When the full-cook method of this application is utilized, it will be appreciated that heat is applied along the lines of bones defining a portion of the skeletal structure in the manner illustrated in the above mentioned application. This still enables a clean severance of the loins of tuna from the skeletal structure. It will also be apparent that the method of the above mentioned application may be employed and after separation of the loins from the skeletal structure, the loins may be full-cooked by the method of this application. While steam is the preferred method of cooking the exterior of the fish, it is possible to use other cooking media such as electrical resistance heating or infra-red rays.

While we have shown and described the preferred form and method of our invention, it will be appreciated that various changes and modifications may be made therein, particularly in the times and temperatures employed to accomplish pre-cooking without departing from the spirit of our invention as set forth in the appended claims.

We claim:

1. A method of preparing fish for consumption, the fish having a skeletal structure which includes rows of bones extending outwardly with respect to a central spinal formation and membranes extending between said bones in the rows thereof, said rows of bones and membranes defining natural walls extending lengthwise of the fish and defining loins separated by said walls, the steps of cooking the fish by heat applied at the interior of the fish to promote the separation of the loins from the skeletal structure along said walls, cooking the fish by heating the fish externally thereof, the internal and external cooking being carried out to an extent such that the fish is pre-cooked and separating the fish into loins along said walls.

2. A method in accordance with claim 1 in which the internal and external cooking are carried out simultaneously.

3. A method in accordance with claim 1 in which the internal and external coking are carried out simultaneously and while the fish are continuously moved through a cooking area.

4. A method of preparing fish for consumption, the fish having a skeletal structure which includes rows of bones extending outwardly with respect to a central spinal formation and membranes extending between said bones in the rows thereof, said rows of bones and membranes defining natural walls extending lengthwise of the fish and defining loins separated by said walls, the steps of cooking the fish by heat applied at the interior of the fish to promote the separation of the loins from the skeletal structure along said walls, cooking the fish by heating the fish externally thereof, the internal and external cooking being carried out to an extent such that the fish is precooked while the fish are continuously moved through a cooking area and separating the fish into loins along said walls.

5. A method of preparing fish for consumption, the fish having a skeletal structure which includes rows of bones extending outwardly with respect to a central spinal formation and membranes extending between said bones in the rows thereof, said rows of bones and membranes defining natural walls extending lengthwise of the fish and defining loins separated by said walls, the steps of applying steam directly to the interior of the fish and including the portions of the fish adjacent said walls so that the interior of the fish is cooked at least at substantially no slower rate than the exterior of the fish and separating the loins from the skeletal structure along said walls.

6. A method of preparing fish for consumption, the fish having a skeletal structure which includes rows of bones extending outwardly with respect to a central spinal formation and membranes extending between said bones in the rows thereof, said rows of bones and membranes defining natural walls extending lengthwise of the fish and defining loins separated by said walls, the steps of applying heat directly to the interior parts of the fish and including the portions of the fish adjacent said walls without substantial diffusion of the heat from the exterior parts of the fish for the purpose of cooking the entire fish and applying heat at a cooking temperature to the exterior of the fish.

7. A method of preparing fish for consumption which comprises cooking the fish by heat applied internally to facilitate separation of the loins from the skeletal structure and simultaneously applying heat externally of the fish until the fish is pre-cooked and then separating the loins from the skeletal structure.

8. A method of preparing fish for consumption, the fish having a skeletal structure which includes rows of bones extending outwardly with respect to a central spinal formation and membranes between the bones in the rows thereof, said rows of bones and membranes and membranes defining natural walls extending lengthwise of the fish and defining loins separated by said walls, the steps of applying heat to the fish particularly along said walls from a source within the fish to enable separation of the loins from the skeletal structure and applying heat to other portions of the fish until the fish as a whole is pre-cooked.

9. A method of preparing fish for consumption, the fish having a skeletal structure which includes rows of bones extending outwardly with respect to a central spinal formation and membranes between the bones in the rows thereof, said rows of bones and membranes and membranes defining natural walls extending lengthwise of the fish and defining loins separated by said walls, the steps of applying heat to the fish particularly along said walls to enable separation of the loins from the skeletal structure, separating the loins from the skeletal structure and then pre-cooking the loins by applying the heat at least partially interiorly of the exterior of the loins.

10. A method of preparing fish for consumption, the fish having a skeletal structure which includes rows of bones extending outwardly with respect to a central spinal formation and membranes between the bones in the rows thereof, said rows of bones and membranes and membranes defining natural walls extending lengthwise and defining loins separated by said walls, the steps of applying heat to the fish along said walls to enable separation of the loins from the skeletal structure, separating the loins from the skeletal structure and then pre-cooking the loins by applying heat both internally and externally of the loins, the internal heat being supplied from a source within the loins projected through the exterior of the loins.

11. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of moving the fish through a cooking area, pre-cooking the fish throughout as they pass through said area, said pre-cooking including cooking the fish along said walls by supplying internal heat thereto and then separating the loins from the skeletal structure.

12. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of continuously moving the fish through a cooking area, pre-cooking the fish throughout as they pass through said area, said precooking including cooking the fish along said walls by supplying internal heat thereto and then separating the loins from the skeletal structure with the loins substantially free of bones and with the skeletal structure substantially intact.

13. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of moving the fish through a cooking area, precooking the fish throughout its length and girth and along said walls by heat applied directly internally of the fish and separating the fish into loins along said walls with the loins substantially free of any substantial portions of the skeletal structure.

14. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of continuously moving the fish through a cooking area, pre-cooking the fish throughout its length and girth and along said walls by heat applied directly internally of the fish and by heat applied externally of the fish and separating the fish into loins along said walls with the loins substantially free of any substantial portions of the skeletal structure.

References Cited in the file of this patent

UNITED STATES PATENTS

| | | |
|---|---|---|
| 2,493,586 | Lang | Jan. 3, 1950 |
| 2,635,050 | Stevenson et al. | Apr. 14, 1953 |
| 2,954,298 | Anderson et al. | Sept. 27, 1960 |